United States Patent
Hase et al.

(10) Patent No.: US 9,558,434 B2
(45) Date of Patent: Jan. 31, 2017

(54) REMOTE OPERATION SYSTEM, IMAGE FORMING APPARATUS, REMOTE OPERATION APPARATUS, AND RECORDING MEDIUM

(71) Applicants: Junichi Hase, Osaka (JP); Manabu Furukawa, Nagaokakyo (JP); Nobuhiro Mishima, Osaka (JP); Masaya Hashimoto, Itami (JP); Akihiro Torigoshi, Amagasaki (JP)

(72) Inventors: Junichi Hase, Osaka (JP); Manabu Furukawa, Nagaokakyo (JP); Nobuhiro Mishima, Osaka (JP); Masaya Hashimoto, Itami (JP); Akihiro Torigoshi, Amagasaki (JP)

(73) Assignee: KONICA MINOLTA BUSINESS TECHNOLOGIES, INC., Chiyoda-ku, Tokyo (JP)

(*) Notice: Subject to any disclaimer, the term of this patent is extended or adjusted under 35 U.S.C. 154(b) by 0 days.

(21) Appl. No.: 13/752,778

(22) Filed: Jan. 29, 2013

(65) Prior Publication Data
US 2013/0208309 A1 Aug. 15, 2013

(30) Foreign Application Priority Data
Feb. 9, 2012 (JP) .................. 2012-026409

(51) Int. Cl.
*G06F 3/12* (2006.01)
*G06K 1/00* (2006.01)
(Continued)

(52) U.S. Cl.
CPC ............ *G06K 15/40* (2013.01); *G03G 15/502* (2013.01); *G03G 15/5075* (2013.01); *G06F 3/0488* (2013.01); *G06K 15/002* (2013.01)

(58) Field of Classification Search
CPC .......... G06F 3/00; G06F 15/16; G06F 9/4445; H04N 1/00472; H04N 1/00408; H04N 1/00413; H04N 1/00416
(Continued)

(56) References Cited

U.S. PATENT DOCUMENTS 5,038,401 A * 8/1991 Inotsume ........................ 455/92
5,963,257 A * 10/1999 Katata et al. ............ 375/240.11
(Continued)

FOREIGN PATENT DOCUMENTS

| CN | 1968335 A | 5/2007 |
| JP | 05-122424 A | 5/1993 |

(Continued)

OTHER PUBLICATIONS

Office Action (Notice of Reasons for Refusal) issued Jan. 28, 2014, by the Japan Patent Office in corresponding Japanese Patent Application No. 2012-026409, and an English Translation of the Office Action. (8 pages).

(Continued)

*Primary Examiner* — Akwasi M Sarpong
(74) *Attorney, Agent, or Firm* — Buchanan Ingersoll & Rooney PC

(57) ABSTRACT

A remote operation system comprises an image forming apparatus and a remote operation apparatus. The image forming apparatus has an operation input part including a touch panel and a hardware key and a transmission part for transmitting synthesizable area information indicating a synthesizable area in a candidate screen (first screen) of the remote operation screen to the remote operation apparatus. The first screen is a screen including a touch panel area and a hardware key area, and the synthesizable area is defined in the synthesizable area information as an area not including a hardware key image. The remote operation apparatus (Continued)

generates a second screen by synthesizing an additional image to be added to the first screen into the synthesizable area of the first screen on the basis of the synthesizable area information and displays the second screen on the display part as the remote operation screen.

10 Claims, 17 Drawing Sheets

(51) Int. Cl.
    *H04N 1/00*     (2006.01)
    *H04N 1/29*     (2006.01)
    *H04N 3/10*     (2006.01)
    *G06K 15/00*     (2006.01)
    *G06F 3/0488*     (2013.01)
    *G03G 15/00*     (2006.01)

(58) Field of Classification Search
    USPC ... 358/1.9, 1.18, 1.15, 1.1; 375/240.11, 240, 375/173; 455/92
    See application file for complete search history.

(56) References Cited

U.S. PATENT DOCUMENTS

| | | | | |
|---|---|---|---|---|
| 5,986,708 | A * | 11/1999 | Katata et al. | 375/240.1 |
| 6,023,301 | A * | 2/2000 | Katata et al. | 348/586 |
| 6,084,914 | A * | 7/2000 | Katata et al. | 375/240 |
| 7,536,128 | B2 * | 5/2009 | Haga | 399/82 |
| 2004/0268352 | A1 * | 12/2004 | Honma | 718/100 |
| 2005/0134876 | A1 * | 6/2005 | Honma et al. | 358/1.9 |
| 2005/0146751 | A1 * | 7/2005 | Haga | 358/1.18 |
| 2006/0274362 | A1 * | 12/2006 | Kita | 358/1.15 |
| 2007/0109561 | A1 * | 5/2007 | Suzue | 358/1.1 |
| 2007/0109578 | A1 | 5/2007 | Suzue | |
| 2009/0310180 | A1 * | 12/2009 | Uchida et al. | 358/1.15 |
| 2010/0169785 | A1 * | 7/2010 | Jesudason | 715/733 |
| 2012/0019562 | A1 * | 1/2012 | Park et al. | 345/657 |

FOREIGN PATENT DOCUMENTS

| | | |
|---|---|---|
| JP | 2007-140756 A | 6/2007 |
| JP | 2008-071313 A | 3/2008 |
| JP | 2010-157240 A | 7/2010 |
| JP | 2012-023491 A | 2/2012 |

OTHER PUBLICATIONS

Office Action (Examiner's Decision to Grant a Patent) Issued on May 7, 2014, by the Japan Patent Office in corresponding Japanese Patent Application No. 2012-026409, and an English Translation of the Office Action (6 pages).

First Office Action Issued on Dec. 31, 2014, by the State Intellectual Property Office of the People's Republic of China in corresponding Chinese Patent Application No. 201310044715.2, and an English Translation of the Office Action (32 pages).

* cited by examiner

| SCREEN NUMBER | SYNTHESIZABLE MAIN AREA | SYNTHESIZABLE SUBAREA | SUBAREA TYPE |
|---|---|---|---|
| 001 | LP(20,30)~RP(430,330) | — | — |
| 002 | LP(20,30)~RP(430,330) | SYNTHESIZABLE SUBAREA CA21 LP(300,200)~RP(330,220) | BUTTON IMAGE |
|  |  | SYNTHESIZABLE SUBAREA CA22 LP(50,50)~RP(400,300) | LOWER LEVEL IMAGE |
| ... | ... | ... | ... |

PG10 →  (row 001)
PG20 →  (row 002)

| SCREEN NUMBER | ADDITIONAL IMAGE | HIERARCHICAL LEVEL | TYPE |
|---|---|---|---|
| 001 | — | — | — |
| 002 | ADDITIONAL IMAGE GS21 | FIRST LEVEL | BUTTON IMAGE |
|  | ADDITIONAL IMAGE GS22 | SECOND LEVEL | LOWER LEVEL IMAGE |
| ⋮ | ⋮ | ⋮ | ⋮ |

| SCREEN NUMBER | SYNTHESIZABLE MAIN AREA | SYNTHESIZABLE SUBAREA | SUBAREA TYPE | KEY ARRANGEABLE AREA |
|---|---|---|---|---|
| 001 | LP(20,30)~RP(430,330) | SYNTHESIZABLE SUBAREA CA41 LP(400,350)~RP(450,400) | BUTTON IMAGE | AREA HA1(400,350)~(420,400) AREA HA2(430,350)~(450,400) |
| | | SYNTHESIZABLE SUBAREA CA42 LP(20,30)~RP(430,330) | LOWER LEVEL IMAGE | |
| 002 | LP(20,30)~RP(430,330) | SYNTHESIZABLE SUBAREA CA41 LP(400,350)~RP(450,400) | BUTTON IMAGE | AREA HA1(400,350)~(420,400) AREA HA2(430,350)~(450,400) |
| | | SYNTHESIZABLE SUBAREA CA42 LP(20,30)~RP(430,330) | LOWER LEVEL IMAGE | |
| ... | ... | ... | ... | ... |

| SCREEN NUMBER | ADDITIONAL IMAGE | HIERARCHICAL LEVEL | TYPE |
|---|---|---|---|
| 001 | ADDITIONAL IMAGE_GS411 | FIRST LEVEL | BUTTON IMAGE |
| | ADDITIONAL IMAGE_GS412 | | |
| | ADDITIONAL IMAGE_GS421 | SECOND LEVEL | LOWER LEVEL IMAGE |
| | ADDITIONAL IMAGE_GS422 | | |
| 002 | ADDITIONAL IMAGE_GS411 | FIRST LEVEL | BUTTON IMAGE |
| | ADDITIONAL IMAGE_GS412 | | |
| | ADDITIONAL IMAGE_GS421 | SECOND LEVEL | LOWER LEVEL IMAGE |
| | ADDITIONAL IMAGE_GS422 | | |
| ⋮ | ⋮ | ⋮ | ⋮ |

REMOTE OPERATION SYSTEM, IMAGE FORMING APPARATUS, REMOTE OPERATION APPARATUS, AND RECORDING MEDIUM

This application is based on Japanese Patent Application No. 2012-026409 filed on Feb. 9, 2012, the contents of which are hereby incorporated by reference.

BACKGROUND OF THE INVENTION

Field of the Invention

The present invention relates to a remote operation system and a technique relevant to the same.

Description of the Background Art

In the field of a remote operation system, there is a technique in which a remote operation screen is displayed on a display part of a remote operation apparatus for the purpose of a remote operation (remote control) of an apparatus (operation object apparatus) to be operated. Japanese Patent Application Laid Open Gazette No. 2008-071313 (Patent Document 1), for example, discloses a technique in which a remote operation screen including a display screen image simulating a display screen on a display of a remote operation object apparatus and a hardware key image simulating the appearance of a hardware key group of the remote operation object apparatus is displayed on a screen display part of a remote operation apparatus.

By using the technique of Patent Document 1, a remote operation of an image forming apparatus (remote operation object apparatus) can be performed while a remote operation screen including a touch panel image representing a touch panel of the image forming apparatus and a hardware key image representing a hardware key of the image forming apparatus is displayed on a display part of a remote operation apparatus.

In some cases, during the remote operation of the image forming apparatus by using the above-described remote operation screen, one or more operations other than the remote operation have to be performed while the remote operation of the image forming apparatus is performed. Specifically, there is a case where a web browsing operation is performed while the remote operation of the image forming apparatus is performed, or the like. In such a case, a web browsing screen image used for web browsing is displayed as an additional image in a partial area of the remote operation screen.

When such an additional image is synthesized into a given area of the remote operation screen and the screen is displayed, however, (though depending on the area into which the additional image is synthesized), there is a possibility that the hardware key image in the remote operation screen may be hidden behind the additional image and this makes it hard to perform the remote operation of the hardware key of the image forming apparatus.

SUMMARY OF THE INVENTION

It is an object of the present invention to provide a technique for performing a reliable remote operation of a hardware key of an image forming apparatus.

The present invention is intended for a remote operation system. According to a first aspect of the present invention, the remote operation system includes an image forming apparatus and a remote operation apparatus for remotely operating the image forming apparatus by using a remote operation screen, and in the remote operation system of the present invention, the image forming apparatus has an operation input part including a touch panel and a hardware key and a transmission part for transmitting synthesizable area information indicating a synthesizable area in a first screen which is a candidate screen of the remote operation screen to the remote operation apparatus, the first screen is a screen including a touch panel area used for displaying a touch panel image representing the touch panel and a hardware key area used for displaying a hardware key image representing the hardware key, the synthesizable area is defined in the synthesizable area information as an area not including the hardware key image, and the remote operation apparatus has a receiving part for receiving the synthesizable area information, a display part for displaying the remote operation screen, and a display control part for generating a second screen by synthesizing an additional image to be added to the first screen into the synthesizable area of the first screen on the basis of the synthesizable area information and displaying the second screen on the display part as the remote operation screen.

The present invention is also intended for an image forming apparatus. According to a second aspect of the present invention, the image forming apparatus includes an operation input part including a touch panel and a hardware key and a transmission part for transmitting synthesizable area information indicating a synthesizable area in a first screen which is a candidate screen of a remote operation screen to a remote operation apparatus which is an apparatus using the remote operation screen, and in the image forming apparatus of the present invention, the first screen is a screen including a touch panel area used for displaying a touch panel image representing the touch panel and a hardware key area used for displaying a hardware key image representing the hardware key, and the synthesizable area is defined in the synthesizable area information as an area not including the hardware key image.

The present invention is still also intended for a non-transitory computer-readable recording medium. According to a third aspect of the present invention, the non-transitory computer-readable recording medium records therein a computer program to be executed by a computer incorporated in an image forming apparatus to cause the computer to perform the steps of a) generating synthesizable area information indicating a synthesizable area in a first screen which is a candidate screen of a remote operation screen and b) transmitting the synthesizable area information to a remote operation apparatus which is an apparatus using the remote operation screen, and in the recording medium of the present invention, the first screen is a screen including a touch panel area used for displaying a touch panel image representing a touch panel of the image forming apparatus and a hardware key area used for displaying a hardware key image representing a hardware key of the image forming apparatus, and the synthesizable area is defined in the synthesizable area information as an area not including the hardware key image.

The present invention is further intended for a remote operation apparatus for remotely operating an image forming apparatus. According to a fourth aspect of the present invention, the remote operation apparatus includes a receiving part for receiving synthesizable area information indicating a synthesizable area in a first screen which is a candidate screen of a remote operation screen, a display part for displaying the remote operation screen, and a display control part for generating a second screen by synthesizing an additional image to be added to the first screen into the synthesizable area of the first screen on the basis of the synthesizable area information and displaying the second screen on the display part as the remote operation screen, and in the remote operation apparatus of the present invention, the first screen is a screen including a touch panel area used for displaying a touch panel image representing a touch panel of the image forming apparatus and a hardware key area used for displaying a hardware key image representing a hardware key of the image forming apparatus, and the synthesizable area is defined in the synthesizable area information as an area not including the hardware key image.

The present invention is still further intended for a non-transitory computer-readable recording medium. According to a fifth aspect of the present invention, the non-transitory computer-readable recording medium records therein a computer program to be executed by a computer to cause the computer to perform the steps of a) receiving synthesizable area information indicating a synthesizable area in a first screen which is a candidate screen of a remote operation screen and b) generating a second screen by synthesizing an additional image to be added to the first screen into the synthesizable area of the first screen on the basis of the synthesizable area information and displaying the second screen as the remote operation screen, and in the recording medium of the present invention, the first screen is a screen including a touch panel area used for displaying a touch panel image representing a touch panel of the image forming apparatus which is a remote operation object apparatus and a hardware key area used for displaying a hardware key image representing a hardware key of the image forming apparatus, and the synthesizable area is defined in the synthesizable area information as an area not including the hardware key image.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a view showing synthesizable area information;

FIG. 12 is a view showing a control table;

FIG. 13 is a view showing synthesizable area information in accordance with a second preferred embodiment of the present invention;

FIG. 17 is a view showing a control table.

DESCRIPTION OF THE PREFERRED EMBODIMENTS

1. The First Preferred Embodiment 1-1. Overall Configuration

Figure 1:
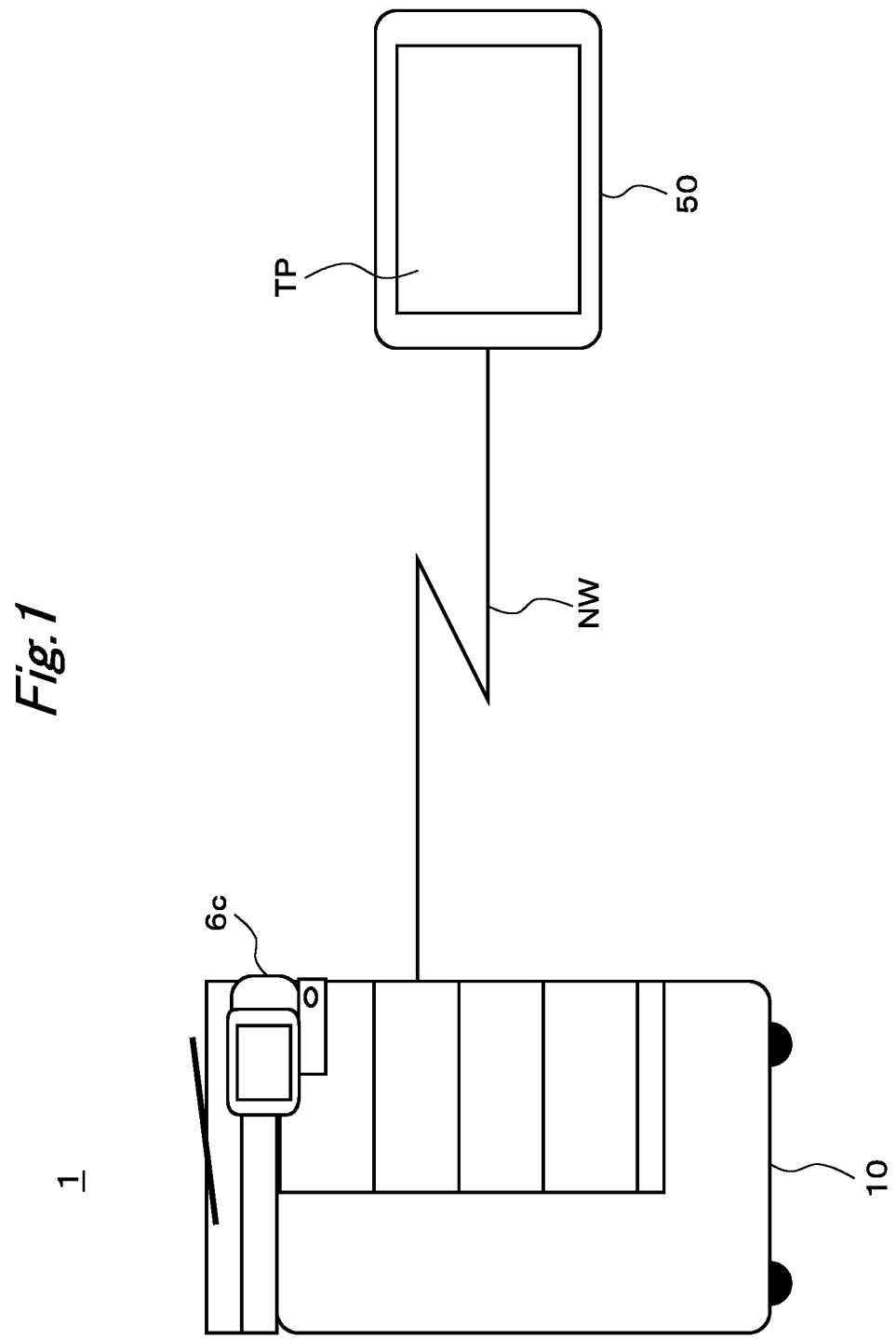
FIG. 1 is a view schematically showing a configuration of a remote operation system in accordance with a first preferred embodiment of the present invention.

FIG. 1 is a schematic view showing a configuration of a remote operation system (remote control system) 1 in accordance with the first preferred embodiment of the present invention. As shown in FIG. 1, the remote operation system 1 comprises an image forming apparatus 10 and a remote operation apparatus (remote control apparatus) 50. The image forming apparatus 10 and the remote operation apparatus 50 are communicable to each other via a network NW. The network NW includes a LAN (Local Area Network), the internet, and the like. The connection to the network NW may be wired or wireless.

The image forming apparatus 10 is an apparatus which is remotely operated by the remote operation apparatus 50, and therefore is also referred to as a "remote operation object apparatus".

The remote operation apparatus 50 is an apparatus which remotely operates the image forming apparatus 10 by using a remote operation screen, and therefore is also referred to as an "apparatus using a remote operation screen".

1-2. Constitution of Image Forming Apparatus

The image forming apparatus 10 is an apparatus (also referred to as a multifunction machine) having a scanner function, a copy function, a facsimile communication function, a box storage function, and the like. Herein, as an example of the image forming apparatus 10, shown is an MFP (Multi-Functional Peripheral).

Figure 2:
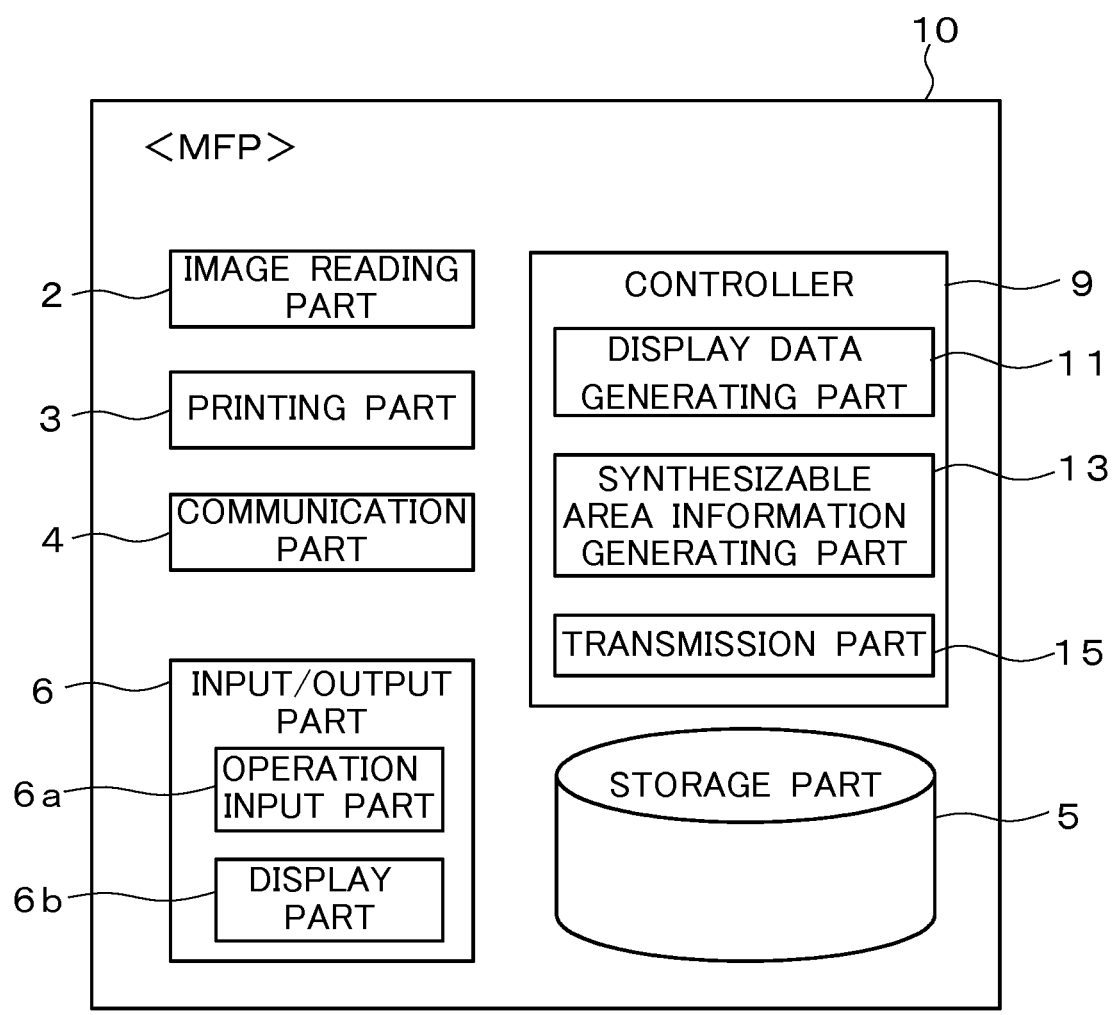
FIG. 2 is a functional block diagram showing a constitution of an image forming apparatus.

As shown in the functional block diagram of FIG. 2, the MFP 10 comprises an image reading part 2, a printing part 3, a communication part 4, a storage part 5, an input/output part 6, a controller 9, and the like and multiply uses these constituent parts to implement various functions.

The image reading part 2 is a processing part which optically reads (in other words, scans) an original manuscript placed on a predetermined position of the MFP 10 and generates image data of the original manuscript (also referred to as an "original manuscript image" or a "scan image").

The printing part 3 is an output part which prints out an image to various media such as paper on the basis of the data on an object to be printed.

The communication part 4 is a processing part capable of performing facsimile communication via public networks or the like. Further, the communication part 4 is capable of performing network communication via the network NW. The network communication uses various protocols such as TCP/IP (Transmission Control Protocol/Internet Protocol) and the like. By using the network communication, the MFP 10 can transmit and receive various data to/from desired partners (for example, the remote operation apparatus 50 and the like).

The storage part 5 is a storage unit such as a hard disk drive (HDD) or/and the like.

Figure 3:
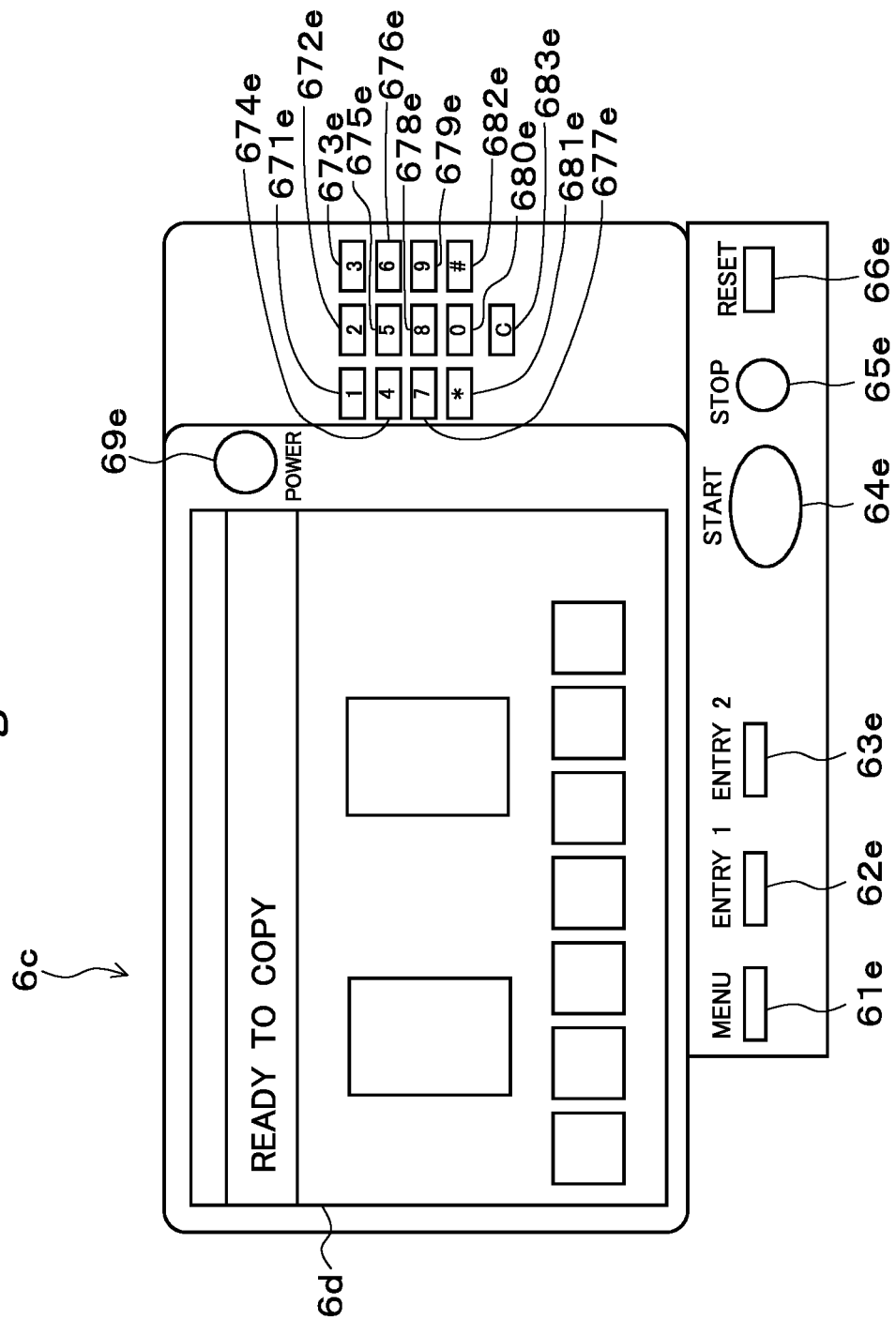
FIG. 3 is a view showing an appearance of an operation input part of the image forming apparatus.

The input/output part 6 comprises an operation input part 6a for receiving an input which is given to the MFP 10 and a display part 6b for displaying various information thereon. As shown in FIG. 3, The MFP 10 is provided with a operation panel part 6*c*, and the operation panel part 6*c* is provided with a touch screen (also referred to as a touch panel) 6*d* and various hardware keys 6*e* (61*e* to 66*e*, 671*e* to 683*e*, and 69*e*). The touch screen 6*d* is a liquid crystal display panel in which a piezoelectric sensor or the like is embedded, and serves as part of the display part 6*b* and also serving as part of the operation input part 6*a*. Further, each of the hardware keys 6*e* serves as part of the operation input part 6*a*.

The controller 9 is a control unit for generally controlling the MFP 10. The controller 9 is a computer system which is embedded in the MFP 10 and comprises a CPU, various semiconductor memories (RAM and ROM), and the like. The controller 9 causes the CPU to execute a predetermined software program (hereinafter, also referred to simply as a "program") PG1 stored in the ROM (e.g., EEPROM), to thereby implement various processing parts. Further, the program PG1 may be acquired via various portable (in other words, non-transitory) computer-readable recording media such as a USB memory or the like or via the network NW or the like and installed into the MFP 10.

Specifically, as shown in FIG. 2, the controller 9 implements various processing parts including a display data generating part 11, a synthesizable area information generating part 13 and a transmission part 15.

The display data generating part 11 is a processing part for generating display data on candidate screens PG10 (FIG. 7), PG20 (FIG. 8), and the like of a screen (hereinafter, referred to also as a "remote operation screen") RG used for a remote operation (remote control) of the MFP 10.

Figure 7:
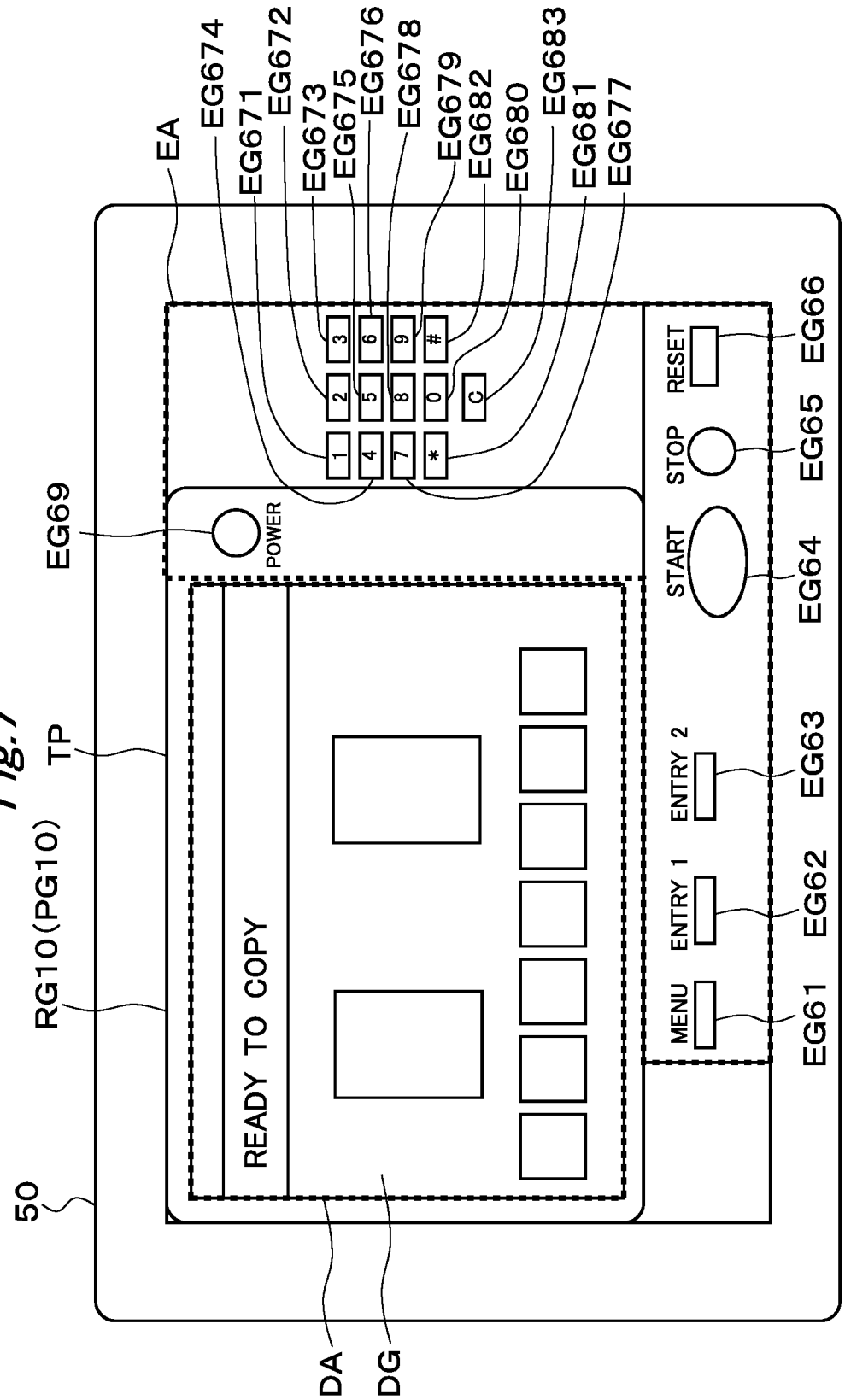
FIG. 7 is a view showing a touch panel of the remote operation apparatus.

The candidate screen PG is a screen simulating a layout of the touch panel 6*d* and the hardware key 6*e* (FIG. 3) and is also a screen (see FIG. 7) simulating a screen layout of the touch panel 6*d* (FIG. 3). In more detail, the candidate screen PG consists of a touch panel area DA (described below) and a hardware key area EA (described below). The touch panel area DA is an area used for displaying a touch panel image DG representing the touch panel 6*d*. The hardware key area EA is an area used for displaying a hardware key image EG representing the hardware key 6*e*. As shown in FIG. 7, the hardware key images EG61 to EG66 are images corresponding to the hardware keys 61*e* to 66*e*, respectively. The hardware key images EG671*e* to EG683*e* are images corresponding to the hardware keys 671*e* to 683*e*, respectively. Further, the hardware key image EG69 is an image corresponding to the hardware key 69*e*.

The synthesizable area information generating part 13 is a processing part for generating information indicating a synthesizable area CA (hereinafter, referred to also as "synthesizable area information GJ1") (see FIG. 5) described below.

The synthesizable area CA is an area in which an image (hereinafter, referred to also as an "additional image") GS used to add an element which is not present in the candidate screen PG is allowed to be synthesized, and is an area in which the synthesis of the additional image GS can be performed.

In the first preferred embodiment, as the synthesizable area CA, a synthesizable main area CA1 and synthesizable subareas CA2 (CA21 and CA22) are defined. The synthesizable main area CA1 and the synthesizable subarea CA2 are defined in the synthesizable area information GJ as areas not including any hardware key image EG.

Specifically, the synthesizable main area CA1 is a common area which is defined for all the candidate screens PG. Herein, the synthesizable main area CA1 is defined as the same area as the touch panel area DA (see FIG. 9).

On the other hand, the synthesizable subareas CA2 (CA21 and CA22) are areas each of which is additionally defined for each candidate screen PG. Herein, the synthesizable subareas CA21 and CA22 are defined additionally only for the candidate screen PG20 (see FIG. 8), and no synthesizable subarea CA2 is defined in the other candidate screens PG. The synthesizable subarea CA21 is defined as an area (see FIG. 9) other than an arrangement area in which software buttons BT1 to BT8 used for the remote operation (see FIG. 8) are already arranged. In more detail, the synthesizable subarea CA21 is defined as an area (hereinafter, referred to also as a "non-arrangement area") in which the software buttons BT1 to BT8 used for the remote operation (see FIG. 8) are not arranged yet in the touch panel area DA. Further, the synthesizable subarea CA22 is also set in a partial area in the touch panel area DA.

In other words, these synthesizable areas CA are defined in accordance with the types of the additional images GS (in more detail, "error notification image", "button image", and "lower level image").

Specifically, the synthesizable main area CA1 is defined as a synthesizable area CA for an additional image GS1 (see FIG. 11) representing the "error notification image". The "error notification image" is an image used for notifying an error when the error occurs.

The synthesizable subarea CA21 is defined as a synthesizable area CA for an additional image GS21 (see FIG. 9) representing the "button image". The "button image" is an image representing a software button (in detail, an "internal memory indication" button) other than the software buttons BT1 to BT8 used for the remote operation.

Figure 10:
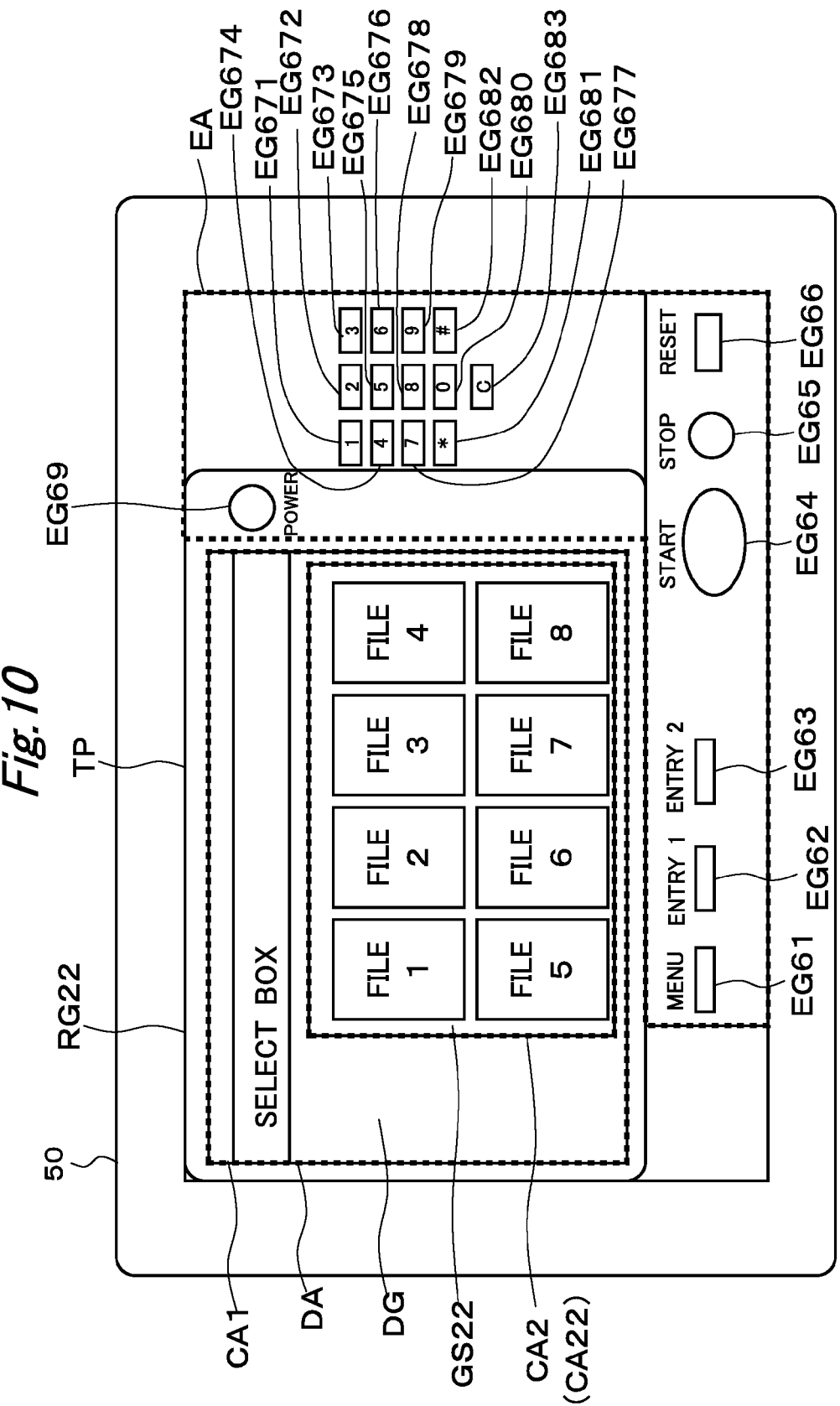

Further, the synthesizable subarea CA22 is defined as a synthesizable area CA for an additional image GS22 (see FIG. 10) representing the "lower level image" of the additional image GS21. The "lower level image" is a lower level image to be displayed in response to an operation input to the button image (an upper level image) in the remote operation screen RG.

FIG. 5 is a view showing the synthesizable area information GJ1 in accordance with the first preferred embodiment.

As shown in FIG. 5, in the synthesizable area information GJ1, recorded are various pieces of information including "Screen Number", "Synthesizable Main Area", "Synthesizable Subarea", and "Subarea Type" for each candidate screen PG.

In the "Screen Number", recorded is the screen number ("001", "002", . . . ) of each candidate screen PG (PG10, PG20, . . . ).

In the "Synthesizable Main Area", coordinate information (in detail, upper-left coordinates LP and lower-right coordinates RP) of the synthesizable main area CA1 in each of the candidate screens PG10, PG20, . . . is recorded. As discussed above, the synthesizable main area CA1 is set for all the candidate screens PG, and therefore the coordinate information of the synthesizable main area CA1 is recorded for the "Synthesizable Main Area" in each of the candidate screens PG10, PG20, . . . .

In the "Synthesizable Subarea", coordinate information (in detail, upper-left coordinates LP and lower-right coordinates RP) of the synthesizable subarea CA2 in each of the candidate screens PG10, PG20, . . . is recorded. As discussed above, the synthesizable subareas CA21 and CA22 are defined only for the candidate screen PG20, and therefore the coordinate information of each of the synthesizable subareas CA21 and CA22 is recorded only for the "Synthesizable Subarea" in the candidate screen PG20.

In the "Subarea Type", recorded is the type of the additional image GS which is allowed to be displayed by synthesis in the synthesizable subarea CA2. Herein, for the "Subarea Type" of a remote operation screen RG2, recorded are the types ("button image" and "lower level image") of the additional images GS which are allowed to be displayed by synthesis in the synthesizable subareas CA21 and CA22.

The transmission part 15 is a processing part for transmitting the display data on the candidate screen PG to the remote operation apparatus 50 and also transmitting the synthesizable area information GJ1 to the remote operation apparatus 50.

1-3. Constitution of Remote Operation Apparatus 50

Figure 4:
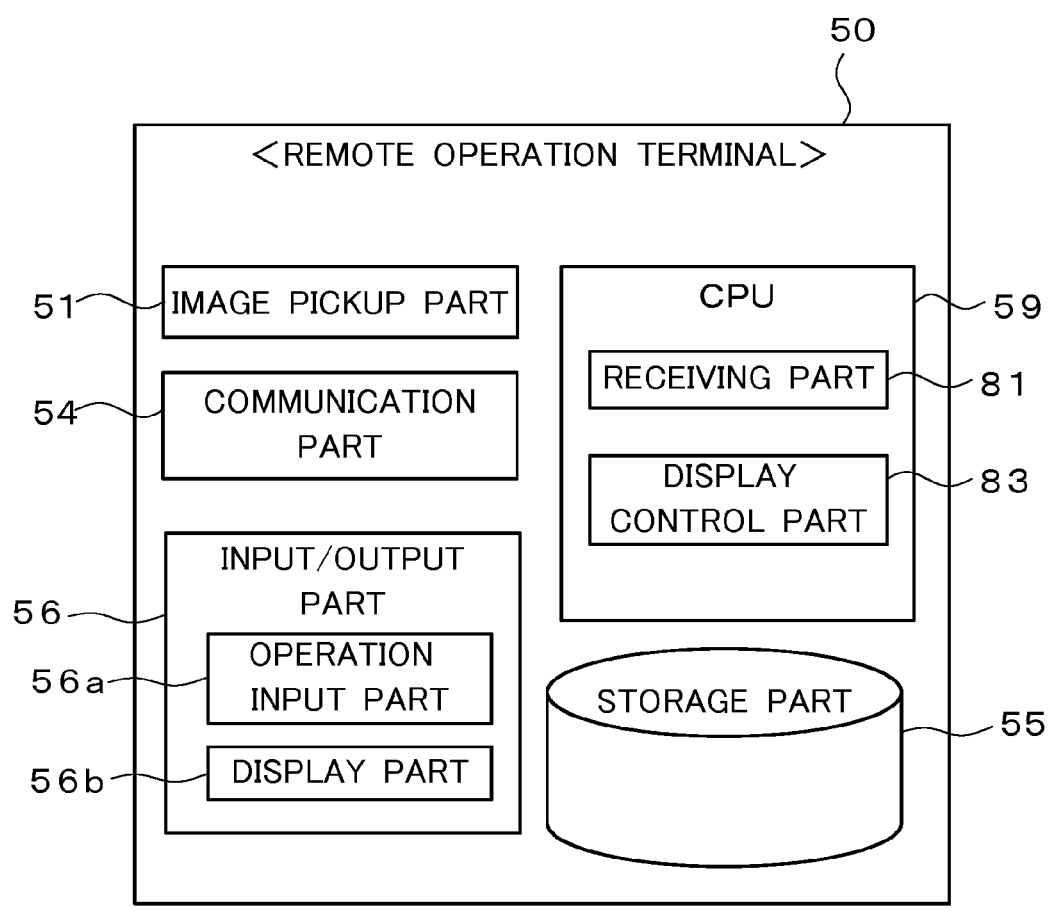
FIG. 4 is a functional block diagram showing a constitution of a remote operation apparatus.

As shown in the functional block diagram of FIG. 4, the remote operation apparatus 50 comprises an image pickup part 51, a communication part 54, a storage part 55, an input/output part 56, a controller 59, and the like and multiply uses these constituent parts to implement various functions.

The image pickup part 51 consists of an optical element such as a lens or the like, a photoelectric conversion element such as a CDD or the like, and the like. The image pickup part 51 is capable of acquiring a picked-up image in which an object around the remote operation apparatus 50 is imaged as a photographic subject.

The communication part 54 is capable of performing network communication via the network NW. The network communication uses various protocols such as TCP/IP (Transmission Control Protocol/Internet Protocol) and the like. By using the network communication, the remote operation apparatus 50 can transmit and receive various data to/from desired partners (the MFP 10 or/and the like).

The storage part 55 is a storage unit such as a hard disk drive (HDD) or/and the like. In the storage part 55, stored is synthesizable area information GJ1 (see FIG. 5) transmitted from the MFP 10. Further, in the storage part 55, stored is a control table TB1 (see FIG. 12) in which the "screen numbers" of the candidate screens PG10, PG20, . . . and the additional images GS21 and GS22 are associated and recorded.

As shown in FIG. 12, in the control table TB1, recorded are various pieces of information including "Screen Number", "Additional Image", "Hierarchical Level", and "Type".

In the "Screen Number", recorded is the screen number ("001", "002", . . . ) corresponding to the candidate screen PG (PG10, PG20, . . . ).

In the "Additional Image", recorded is the additional image GS to be added to the candidate screen PG. Herein, in the "Additional Image" of the second row in the control table TB1, the additional images GS21 and GS22 are recorded. Further, the additional image GS21 is an image representing a software button used for executing an internal memory indicating function. The additional image GS22 is a lower level image of the additional image GS21, and is an image representing a display screen of a list of files stored in the internal memory.

In the "Hierarchical Level", recorded is hierarchical level information of the additional image GS. Herein, in the "Hierarchical Level" of the second row in the control table TB1, respective pieces of hierarchical level information ("first level" and "second level") of the additional images GS21 and GS22 are recorded.

In the "Type", recorded is a type of the additional image GS. Herein, in the "Type" of the second row in the control table TB1, the respective types ("button image" and "lower level image") of the additional images GS21 and GS22 are recorded.

The input/output part 56 comprises an operation input part 56a for receiving an input which is given to the remote operation apparatus 50 and a display part 56b for displaying various information thereon. The remote operation apparatus 50 is provided with a touch panel TP (see FIG. 1) which is a liquid crystal display panel in which a piezoelectric sensor or the like is embedded. The touch panel TP serves as part of the operation input part 56a and also serving as part of the display part 56b.

The controller 59 is a control unit for generally controlling the remote operation apparatus 50. The controller 59 is a computer system which is embedded in the remote operation apparatus 50 and comprises a CPU, various semiconductor memories (RAM and ROM), and the like. The controller 59 causes the CPU to execute a predetermined software program (hereinafter, also referred to simply as a "program") PG2 stored in a memory part (semiconductor memory or the like), to thereby implement various processing parts. Further, the program PG2 may be acquired via various portable (in other words, non-transitory) computer-readable recording media such as a USB memory or the like or via the network NW or the like and installed into the remote operation apparatus 50.

Specifically, as shown in FIG. 4, the controller 59 implements various processing parts including a receiving part 81 and a display control part 83.

The receiving part 81 is a processing part for receiving the synthesizable area information GJ1 and the like transmitted from the MFP 10.

The display control part 83 is a processing part for generating a synthesized screen by synthesizing the additional image GS to be add to the candidate screen PG into the synthesizable area CA of the candidate screen PG and displaying the synthesized screen on the touch panel TP as the remote operation screen RG.

1-4. Operation

Figure 6:
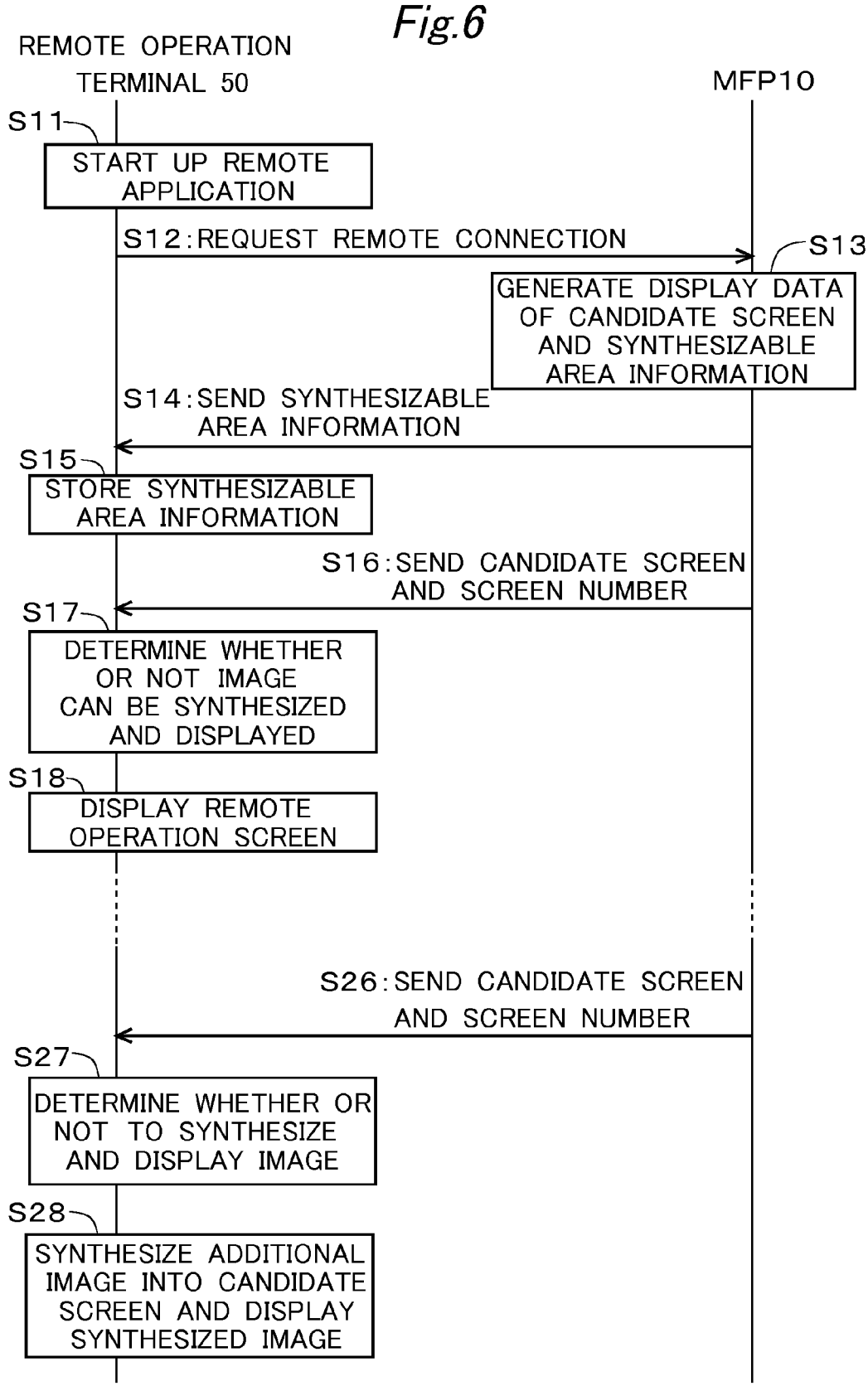
FIG. 6 is a view showing respective operations of the remote operation apparatus and the image forming apparatus.

FIG. 6 is a view showing respective operations of the remote operation apparatus 50 and the MFP 10.

When a predetermined operation input is received from an operator of the remote operation apparatus 50, the remote operation apparatus 50 executes the remote application program PG2 for remotely operating the MFP 10 (Step S11 of FIG. 6), to thereby request the MFP 10 to make remote connection (Step S12).

In response to this request, the MFP 10 generates display data on each of the candidate screens PG10, PG20, . . . and generates the synthesizable area information GJ1 (see FIG. 5) (Step S13).

After that, the MFP 10 sends the synthesizable area information GJ1 (see FIG. 5) to the remote operation apparatus 50 (Step S14).

In response to this operation, the remote operation apparatus 50 stores the synthesizable area information GJ1 transmitted from the MFP 10 into the storage part 55 (Step S15).

After that, the MFP 10 sends the display data on the first candidate screen PG10 (see FIG. 7) and the screen number ("001") thereof to the remote operation apparatus 50 (Step S16).

In response to this operation, the remote operation apparatus 50 specifies the candidate screen PG10 corresponding to the screen number ("001") transmitted from the MFP 10.

Then, the remote operation apparatus 50 determines whether or not an additional image GS should be synthesized into the specified candidate screen PG10 and displayed (Step S17). Specifically, the remote operation apparatus 50 determines whether or not there is an additional image GS associated with the candidate screen on the basis of the control table TB1 (see FIG. 12) and further determines whether or 10, not the additional image GS should be synthesized into the candidate screen and displayed, in accordance with the determination result. In more detail, when it is determined that there is an additional image GS associated with the candidate screen, the remote operation apparatus 50 determines that the additional image GS should be synthesized into the candidate screen and displayed. On the other hand, when it is determined that there is not an additional image GS associated with the candidate screen, the remote operation apparatus 50 determines that no additional image GS should be synthesized into the candidate screen and displayed.

Herein, the remote operation apparatus 50 determines that there is not an additional image GS to be synthesized into the candidate screen PG10 on the basis of the control table TB1 and further determines that no additional image GS should be synthesized into the candidate screen PG10 and displayed. Then, the process goes to Step S18.

In Step S18, as shown in FIG. 7, the remote operation apparatus 50 displays the candidate screen PG10 without any change on the touch panel TP as the remote operation screen RG10.

When the remote operation screen RG10 is displayed on the touch panel TP, the remote operation apparatus 50 goes into a state of waiting for an operation input from the operator (hereinafter, referred to as a "standby state WS1").

When an operation input from the operator is received in the standby state WS1, the remote operation apparatus 50 sends operation input position information (in detail, coordinate information of a position of the operation input).

In response to this operation, the MFP 10 receives the operation input in the remote operation screen RG10 (herein, an operation input for commanding a display of a box operation screen) on the basis of the operation input position information transmitted from the remote operation apparatus 50.

Figure 8:
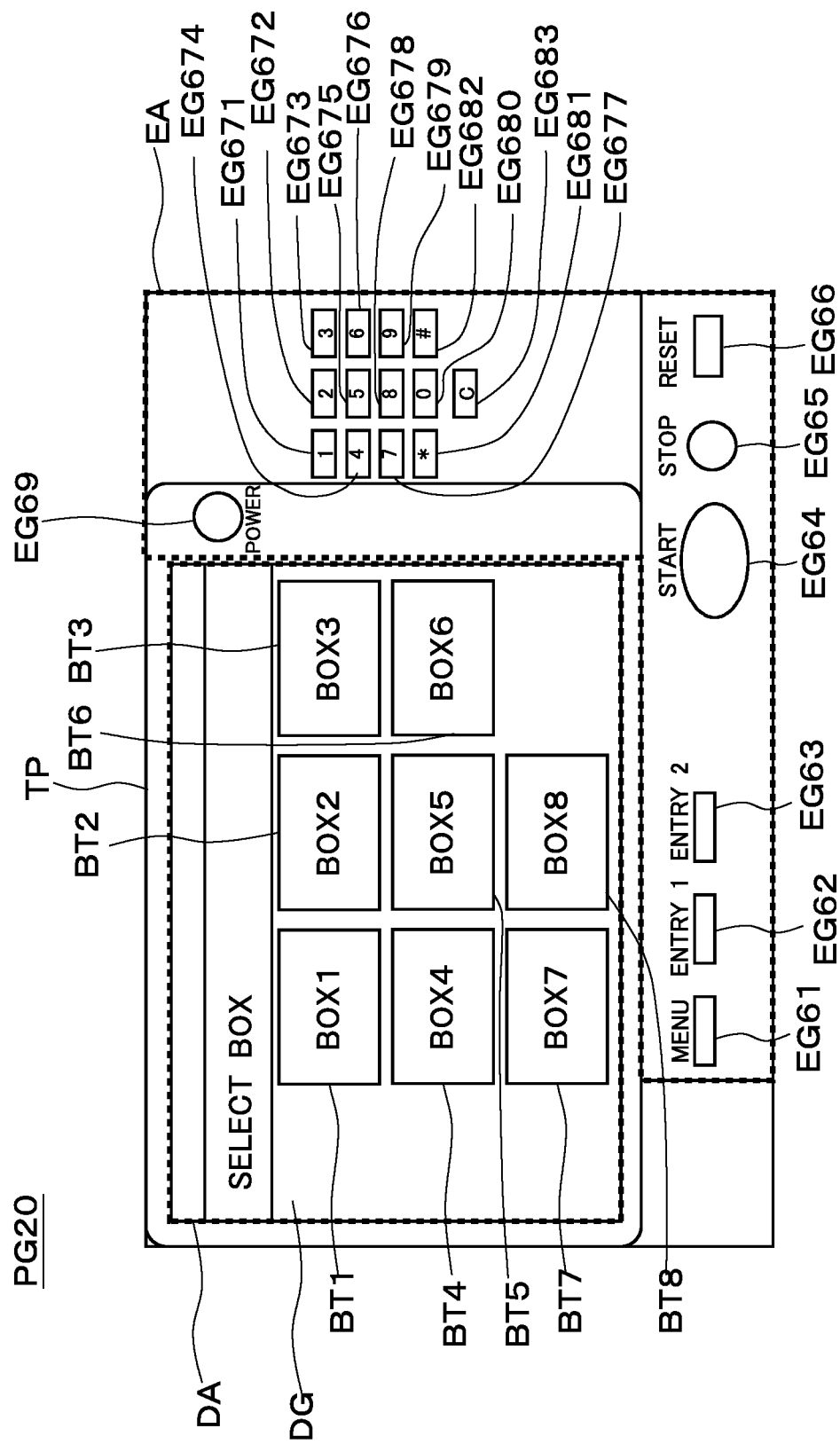
FIG. 8 is a view showing a candidate screen of the remote operation apparatus.

After that, the MFP 10 specifies a new candidate screen PG in accordance with the operation input in the remote operation screen RG10 and generates the display data of the candidate screen PG. Herein, as shown in FIG. 8, the MFP 10 specifies the candidate screen PG20 for displaying the box operation screen in the touch panel area DA as a new candidate screen PG and generates the display data of the candidate screen PG20. Then, the MFP 10 sends the display data of the candidate screen PG20 and the screen number ("002") of the candidate screen PG20 to the remote operation apparatus 50 (Step S26 of FIG. 6).

In response to this operation, the remote operation apparatus 50 specifies the candidate screen PG20 corresponding to the screen number ("002") transmitted from the MFP 10. Then, the remote operation apparatus 50 determines whether or not an additional image GS should be synthesized into the specified candidate screen PG20 and displayed (Step S27). Specifically, the remote operation apparatus 50 determines whether or not there is a first level additional image GS associated with the candidate screen PG20 on the basis of the control table TB1 (see FIG. 12) and further determines whether or not the additional image GS should be synthesized into the candidate screen PG20 and displayed, in accordance with the determination result.

Herein, as shown in the second row of the control table TB1 (FIG. 12), the first level additional image GS21 associated with the candidate screen PG20 is found. Therefore, the remote operation apparatus 50 determines that the first level additional image GS21 is found to be synthesized into the candidate screen PG20 and displayed and further determines that the additional image GS21 should be synthesized into the candidate screen PG20 and displayed.

After that, the remote operation apparatus 50 specifies the synthesizable subarea CA21 whose "Subarea Type" is "button image" with reference to the second row (various information on the candidate screen PG20) of the synthesizable area information GJ1 (FIG. 5). Then, the remote operation apparatus 50 generates a synthesized screen by synthesizing the additional image GS21 into the synthesizable subarea CA21 of the candidate screen PG20 and displays the synthesized screen on the touch panel TP as a remote operation screen RG21 (see FIG. 9) (Step S28).

Then, the remote operation apparatus 50 goes into a state of waiting for another operation input from the operator (hereinafter, referred to as a "standby state WS2").

When an operation input to the additional image GS21 ("button image") in the synthesizable subarea CA21 is received in the standby state WS2, the remote operation apparatus 50 does not send operation input position information to the MFP 10 at this time but performs such an operation as discussed below. Specifically, the remote operation apparatus 50 specifies the synthesizable subarea CA22 whose "Subarea Type" is "lower level image" with reference to the second row of the synthesizable area information GJ1 (FIG. 5). Then, the remote operation apparatus 50 generates a synthesized screen by synthesizing the additional image GS22 which is a lower level image of the additional image GS21 into the synthesizable subarea CA22 of the candidate screen PG20 and displays the synthesized screen on the touch panel TP as a remote operation screen RG22 (see FIG. 10).

Further, when an operation input to an area other than the synthesizable subarea CA21 is received in the standby state WS2, the remote operation apparatus 50 sends operation input position information (in detail, coordinate information of a position of the operation input) to the MFP 10.

Figure 9:
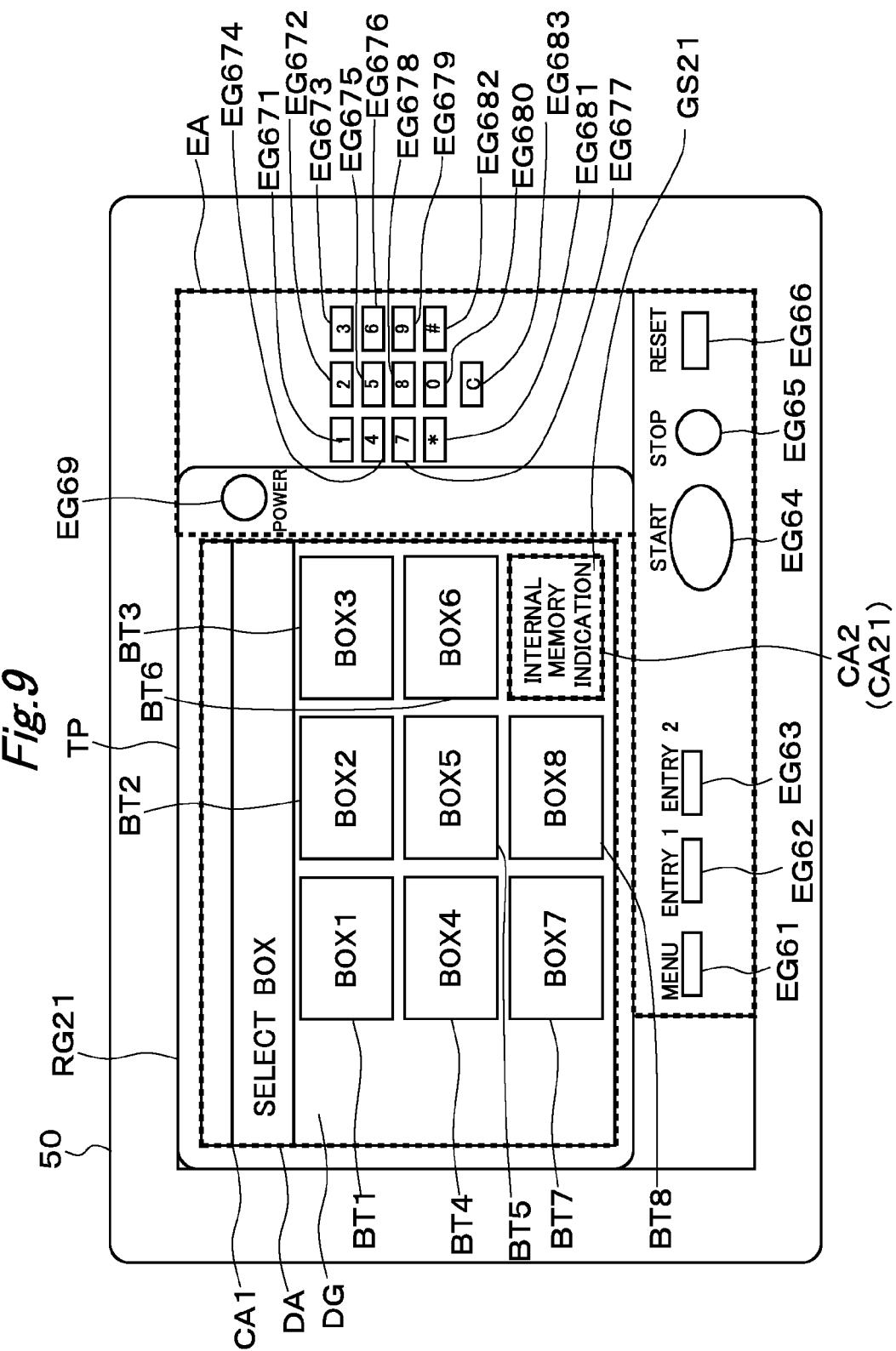
FIGS. 9 to 11 are views each showing the touch panel of the remote operation apparatus.

If an error occurs while the candidate screen PG21 shown in FIG. 9 is displayed, the remote operation apparatus 50 determines the error notification image for notifying an error as the additional image GS1. Then, the remote operation apparatus 50 generates a synthesized screen by synthesizing the additional image GS1 into the synthesizable main area CA1 of the candidate screen PG20 and displays the synthesized screen on the touch panel TP as a remote operation screen RG23 (see FIG. 11).

In the above-discussed operation, since the synthesizable area CA (in more detail, the synthesizable main area CA1 and the synthesizable subareas CA21 and CA22) is defined as an area not including the hardware key image EG, the remote operation screen RG can be displayed without hiding the hardware key image EG behind the additional image GS (in more detail, the additional images GS1, GS21, and GS22). Therefore, it is possible to perform a reliable remote operation of the hardware key 6e of the MFP 10.

Further, the synthesized screen is generated by synthesizing the additional image GS21 into the synthesizable subarea CA21 (an area other than the arrangement area of the software buttons BT1 to BT8 which are already arranged in the touch panel area DA) and displayed as the remote operation screen RG21 (see FIG. 9). For this reason, the software buttons BT1 to BT8 which are already arranged in the touch panel area DA are not hidden behind the additional image GS21. Therefore, it is possible to ensure high operability without disturbing the manipulation of the already-existing software buttons.

Furthermore, the remote operation screen RG is a screen simulating a layout of the touch panel 6d and the hardware key 6e and is also a screen simulating a screen layout of the touch panel 6d. Therefore, it is possible to provide the same operability as that in a case of operating the operation panel part 6c of the MFP 10 to the operator.

2. The Second Preferred Embodiment

The second preferred embodiment is a variation of the first preferred embodiment.

Hereinafter, discussion will be made, centering on the difference between the first and second preferred embodiments.

In the first preferred embodiment, the case has been discussed where both the two synthesizable subareas CA21 and CA22 (see FIGS. 9 and 10) are set in partial areas of the touch panel area DA.

Figure 15:
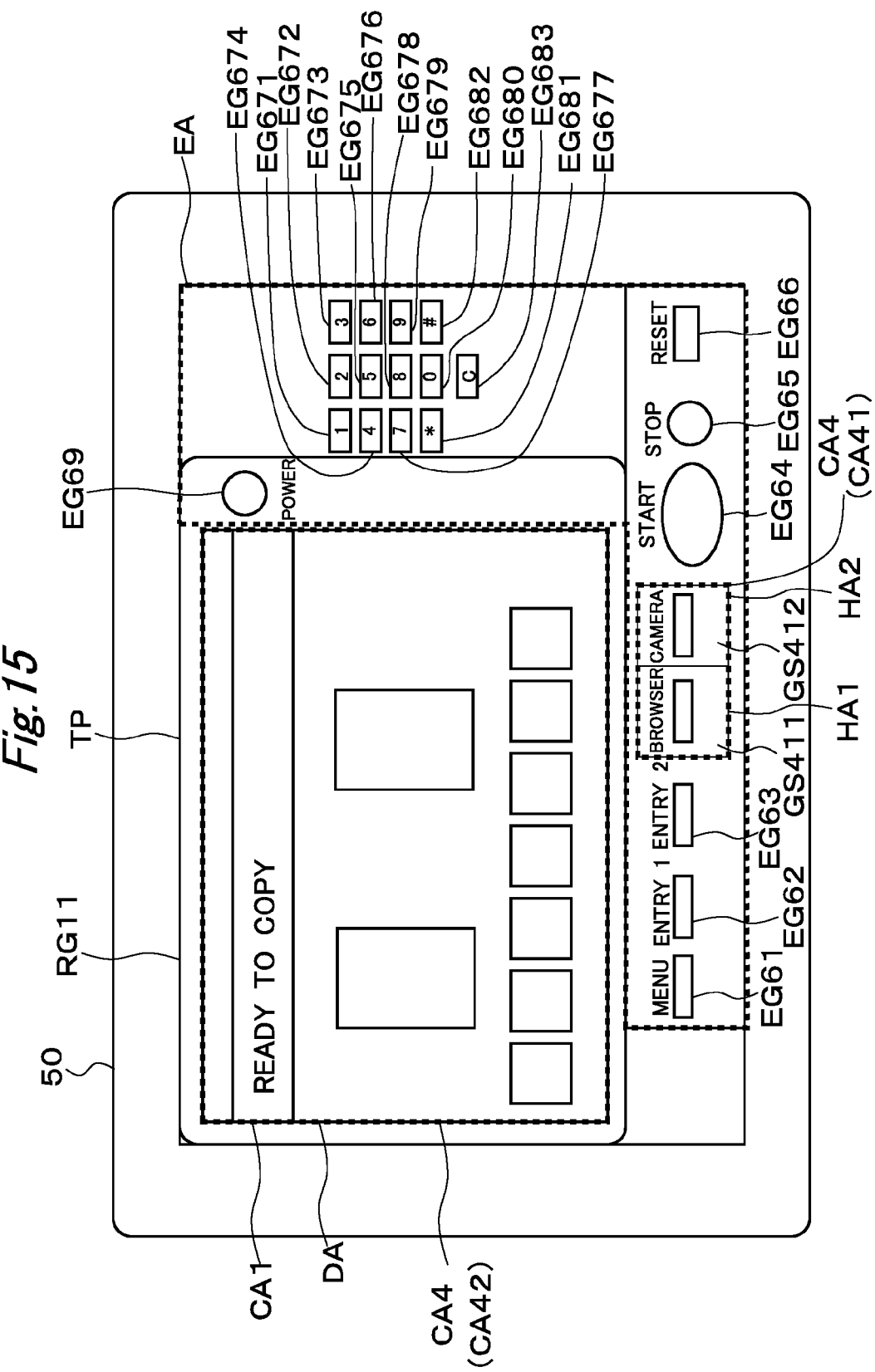
FIGS. 15 and 16 are views each showing the touch panel of the remote operation apparatus.

In the second preferred embodiment, a case will be discussed where one synthesizable subarea CA41 is set in a partial area of the hardware key area EA and the other synthesizable subarea CA42 is set in the same area as the touch panel area DA (in the whole of the touch panel area DA), as shown in FIG. 15.

Specifically, the synthesizable subarea CA41 is set in a partial area of the hardware key area EA in which the hardware key image EG is not arranged (hereinafter, referred to also as a non-arrangement area) (see FIG. 15). Herein, the synthesizable subarea CA41 is set in a blank area (a non-arrangement area in the hardware key image) between the hardware key image EG63 and the hardware key image EG64.

On the other hand, the synthesizable subarea CA42 is set in the same area as the synthesizable main area CA1 (see FIG. 15). Further, the synthesizable main area CA1 is the same area as the touch panel area DA, like in the first preferred embodiment.

Though the synthesizable subareas CA21 and CA22 are defined only for the candidate screen PG20 in the first preferred embodiment, a case will be discussed where the synthesizable subareas CA41 and CA42 are defined not only for the candidate screen PG20 but also for the candidate screen PG10 in the second preferred embodiment.

FIG. 13 is a view showing synthesizable area information GJ2 in accordance with the second preferred embodiment of the present invention.

As shown in FIG. 13, in the synthesizable area information GJ2, "Key Arrangeable Area" is recorded besides the pieces of information recorded in the synthesizable area information GJ1 (see FIG. 5).

In the "Key Arrangeable Area", recorded is coordinate information of an area (hereinafter, referred to also as an "arrangeable area") HA in which arrangement object keys are allowed to be arranged. Herein, in the "Key Arrangeable Area", recorded are pieces of coordinate information of two areas HA1 and HA2 in which two kinds of arrangement object keys are allowed to be arranged, respectively.

FIG. 17 is a view showing a control table TB2 in accordance with the second preferred embodiment.

In the second preferred embodiment, in the "Additional Image" of the first row in the control table TB2, recorded are additional images GS411 and GS412 and additional images GS421 and GS422.

The additional image GS411 is an image representing a button used for starting up a browser function, and the additional image GS412 is an image representing a button used for starting up a camera function. The additional image GS421 is a lower level image of the additional image GS411, which is an image representing a browser screen. The additional image GS422 is a lower level image of the additional image GS412, which is an image picked up by the image pickup part 51.

Further, in the "Hierarchical Level" of the first row in the control table TB2, recorded are hierarchical level information of the additional images GS411 and GS412 ("first level") and hierarchical level information of the additional images GS421 and GS422 ("second level").

In the "Type" of the first row in the control table TB2, recorded are the type of the additional images GS411 and GS412 ("button image") and the type of the additional images GS421 and GS422 ("lower level image").

In the second preferred embodiment, it is assumed that the same content as that in the first row of the control table TB2 is recorded also in the second row and the following rows of the control table TB2.

Figure 14:
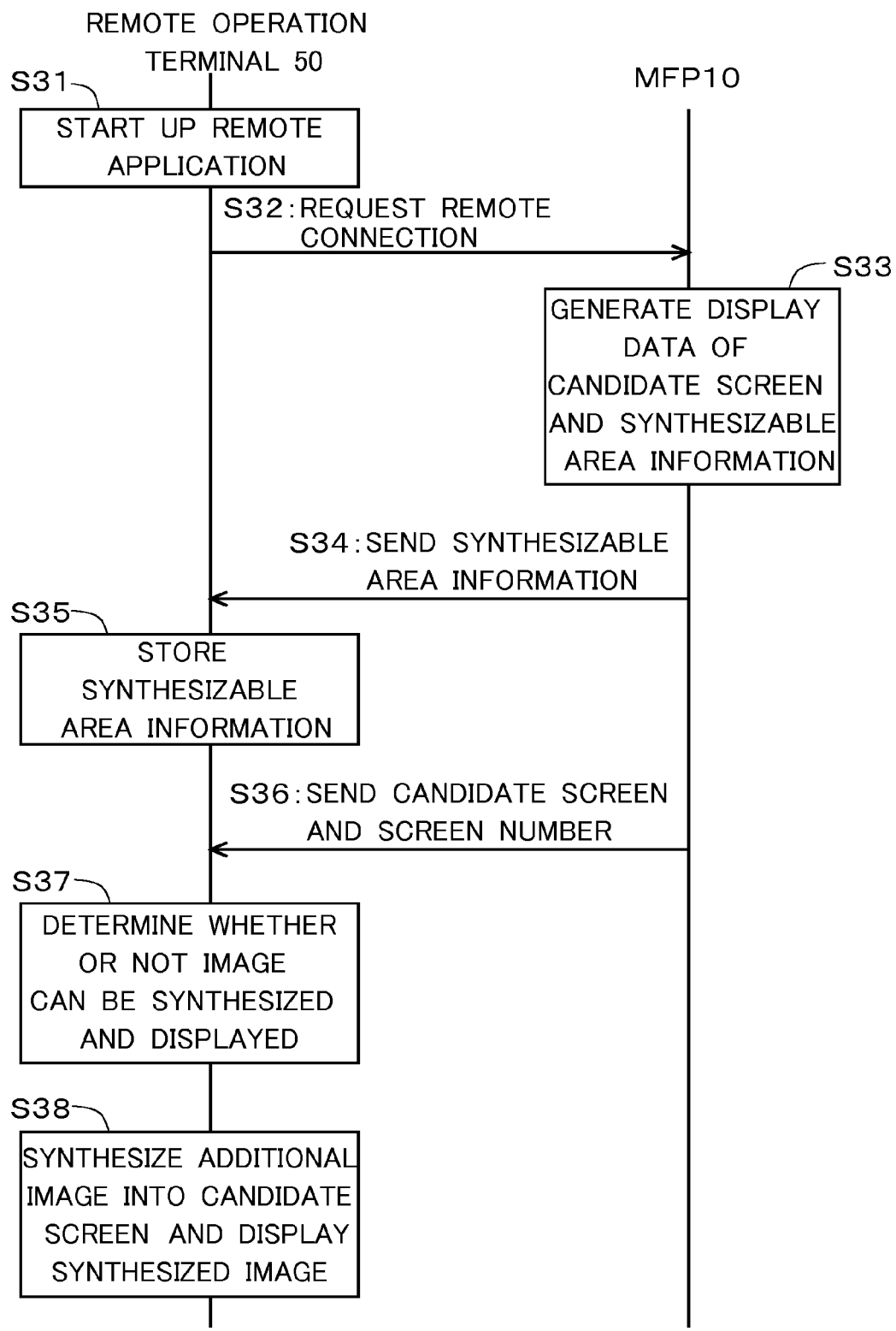
FIG. 14 is a view showing respective operations of the remote operation apparatus and the image forming apparatus.

FIG. 14 is a view showing respective operations of the remote operation apparatus 50 and the MFP 10 in accordance with the second preferred embodiment.

First, in Steps S31 to S36, the same operations as those in Steps S11 to S16 of FIG. 5 are executed.

In Step S37, the remote operation apparatus 50 determines whether or not an additional image GS should be synthesized into the candidate screen PG10 and displayed. Specifically, the remote operation apparatus 50 determines whether or not there is a first level additional image GS associated with the candidate screen PG10 on the basis of the control table TB2 (see FIG. 17) and further determines whether or not the additional image GS should be synthesized into the candidate screen PG10 and displayed, in accordance with the determination result.

Herein, as shown in the first row of the control table TB2 (FIG. 17), the first level additional images GS411 and GS412 associated with the candidate screen PG10 are found. Therefore, the remote operation apparatus 50 determines that the first level additional images GS411 and GS412 are found to be synthesized into the candidate screen PG10 and displayed and further determines that the additional images GS411 and GS412 should be synthesized into the candidate screen PG10 and displayed.

After that, the remote operation apparatus 50 specifies the synthesizable subarea CA41 whose "Subarea Type" is "button image" with reference to the first row (various information on the candidate screen PG10) of the synthesizable area information GJ2 (FIG. 13). The remote operation apparatus 50 further specifies the areas HA1 and HA2 set in the synthesizable subarea CA41.

Then, the remote operation apparatus 50 generates a synthesized screen by synthesizing the additional images GS411 and GS412 into the areas HA1 and HA2 of the candidate screen PG10, respectively, and displays the synthesized screen on the touch panel TP as a remote operation screen RG11 (see FIG. 15) (Step S38).

Then, the remote operation apparatus 50 goes into the standby state WS2 of waiting for an operation input from the operator.

When an operation input to either one of the additional images GS411 and GS412 (see FIG. 15) in the synthesizable subarea CA41 is received in the standby state WS2, the remote operation apparatus 50 performs such an operation as discussed below.

Figure 11:
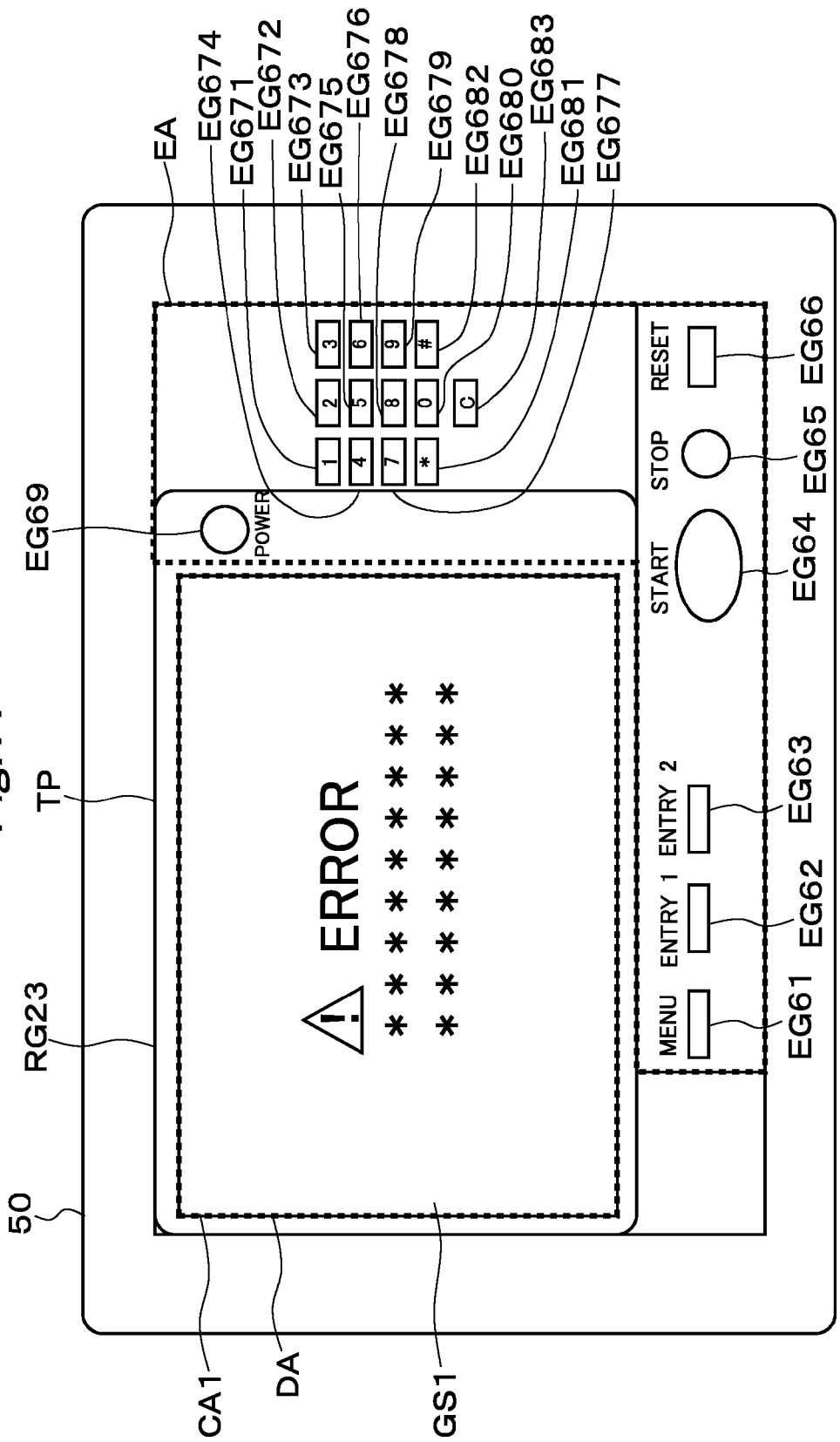
Figure 16:
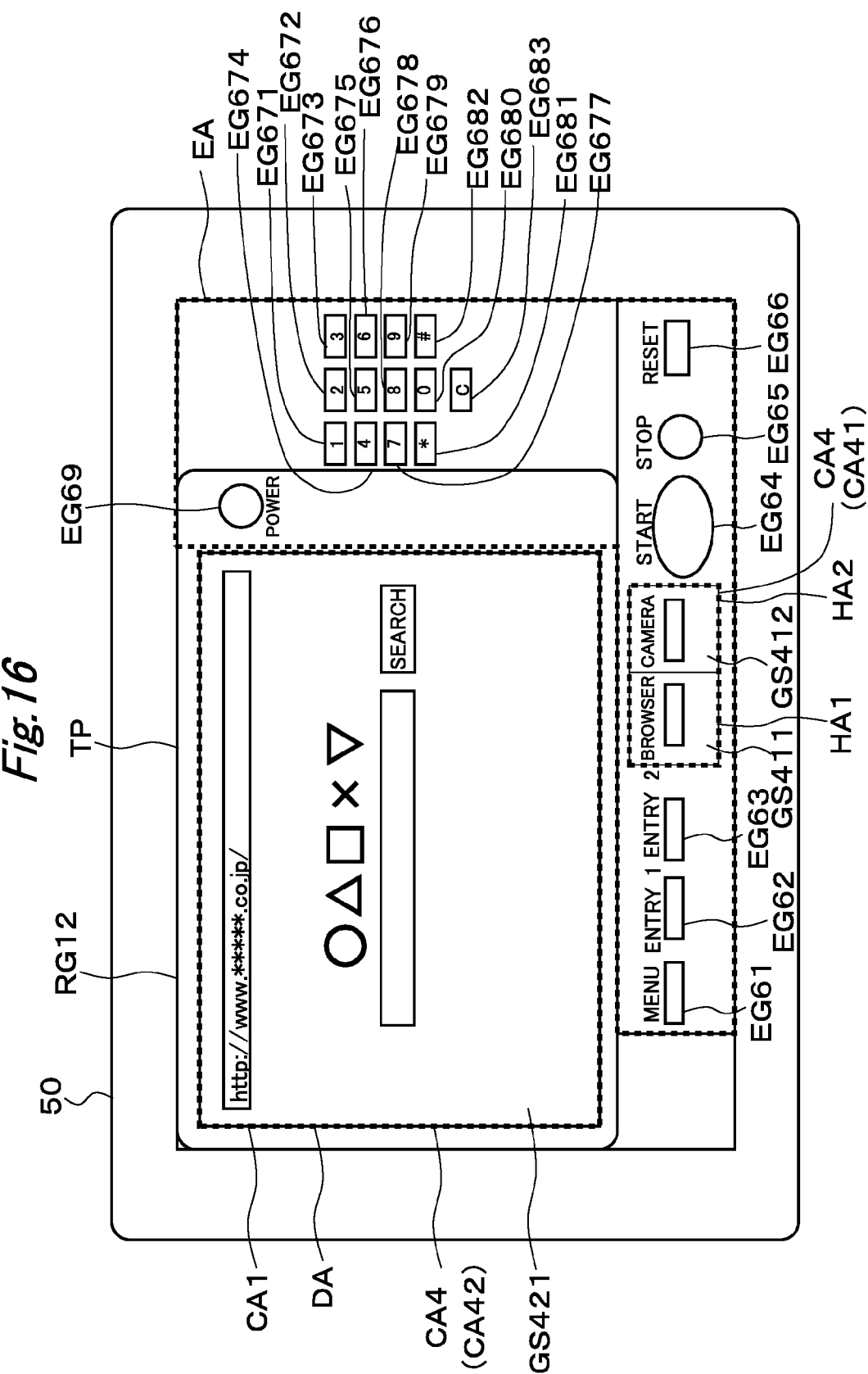

Specifically, when an operation input to the additional image GS411 in the area HA1 is received in the standby state WS2, the remote operation apparatus 50 specifies the synthesizable subarea CA42 whose "Subarea Type" is "lower level image" with reference to the first row of the synthesizable area information GJ2 (FIG. 11). Then, the remote operation apparatus 50 generates a synthesized screen by synthesizing the additional image GS421 which is a lower level image of the additional image GS411 into the synthesizable subarea CA42 and displays the synthesized screen on the touch panel TP as a remote operation screen RG12 (see FIG. 16).

Further, when an operation input to the additional image GS412 in the area HA2 is received in the standby state WS2, the remote operation apparatus 50 specifies the synthesizable subarea CA42 whose "Subarea Type" is "lower level image" with reference to the first row of the synthesizable area information GJ2 (FIG. 11). Then, the remote operation apparatus 50 generates a synthesized screen by synthesizing the additional image GS422 which is a lower level image of the additional image GS412 into the synthesizable subarea CA42 and displays the synthesized screen on the touch panel TP as a remote operation screen RG13 (not shown).

In the above-discussed operation, since the synthesizable area CA (in more detail, the synthesizable main area CA1 and the synthesizable subareas CA411, CA412, and CA42) is defined as an area not including the hardware key image EG, the remote operation screen RG can be displayed without hiding the hardware key image EG behind the additional image GS (in more detail, the additional images GS1, GS411, GS412, GS421, and GS422). Therefore, it is possible to perform a reliable remote operation of the hardware key 6e of the MFP 10.

Further, the synthesizable subarea CA41 is defined as a non-arrangement area in which the hardware key image EG is not arranged, and the additional images GS411 and GS422 are synthesized into the areas HA1 and HA2, respectively, in the synthesizable subarea CA41 which is the non-arrangement area. Therefore, the non-arrangement area in the hardware key area EA can be effectively used.

3. Variations

Though the preferred embodiments of the present invention have been discussed above, the present invention is not limited to the above-discussed preferred embodiments.

Specifically, though the case has been discussed where the MFP 10 generates the display data of the candidate screen PG for the remote operation screen RG and sends the display data to the remote operation apparatus 50 in the above-discussed preferred embodiments, this is only one exemplary case. There may be a case, for example, where the display data of the candidate screen PG is stored in the storage part 55 of the remote operation apparatus 50 in advance and the MFP 10 sends only the screen number of the candidate screen PG to be displayed to the remote operation apparatus 50. In this case, the remote operation apparatus 50 specifies the candidate screen PG to be displayed, on the basis of the screen number transmitted from the MFP 10, and generates a synthesized screen by synthesizing the additional image GS into the candidate screen PG and displays the synthesized screen as the remote operation screen RG.

Further, though the case has been discussed where the additional image GS1 is synthesized into the synthesizable main area CA1 of the candidate screen PG20 (see FIG. 11) when an error occurs while the remote operation screen RG21 is displayed in the above-discussed first preferred embodiment, this is only one exemplary case. If an error occurs while the remote operation screen RG (RG10, RG22, or the like) other than the remote operation screen RG21, for example, the additional image GS1 may be synthesized into the synthesizable main area CA1 of the candidate screen PG (PG10, PG20, or the like) for the remote operation screen RG (RG10, RG22, or the like).

Furthermore, though the case has been discussed where the image representing the button used for receiving the execution command of the "internal memory indicating function" is synthesized as the additional image GS21 into the synthesizable subarea CA21 in the above-discussed first preferred embodiment, this is only one exemplary case. For example, an image representing the button used for receiving the execution command of another function such as a "USB memory display function" or the like may be synthesized as the additional image into the synthesizable subarea CA21.

While the invention has been shown and described in detail, the foregoing description is in all aspects illustrative and not restrictive. It is therefore understood that numerous modifications and variations can be devised without departing from the scope of the invention.

What is claimed is:

1. A remote operation system, comprising:
an image forming apparatus; and
a remote operation apparatus for remotely operating said image forming apparatus by using a remote operation screen,
wherein said image forming apparatus has:
an operation input part including a touch panel and a hardware key; and
a first processor configured to:
transmit first screen information indicating a first screen including a touch panel area used for displaying a touch panel image representing said touch panel and a hardware key area used for displaying a hardware key image representing said hardware key and synthesizable area information indicating a synthesizable area not including said hardware key image to said remote operation apparatus, and
said remote operation apparatus has:
a display for displaying said remote operation screen;
a storage part for storing an information which associates an additional image with said first screen; and
a second processor configured to:
receive said first screen information and said synthesizable area information from said image forming apparatus;
generate a second screen by retrieving said additional image to be added to said first screen using said information stored in said storage part and synthesizing said additional image to be added to said first screen into said synthesizable area of said first screen so that said additional image is positioned on said first screen without hiding the hardware key area, on the basis of said synthesizable area information and said information stored in said storage part; and
display said second screen on said display as said remote operation screen.

2. The remote operation system according to claim 1, wherein
said synthesizable area is an area which is defined in accordance with a type of said additional image.

3. The remote operation system according to claim 2, wherein
said touch panel area in said first screen includes an arrangement area in which software buttons to be used for remote operation are already arranged,
said synthesizable area is an area which is defined for a particular type of additional image and is an area other than said arrangement area, and
said display control part generates said second screen by arranging said particular type of additional image in said synthesizable area.

4. The remote operation system according to claim 2, wherein
said hardware key area in said first screen includes an arrangement area in which said hardware key image is arranged and a non-arrangement area in which said hardware key image is not arranged,
said synthesizable area is an area which is set for a particular type of additional image and is said non-arrangement area in said hardware key area, and
said display control part generates said second screen by arranging said particular type of additional image in said synthesizable area.

5. An image forming apparatus, comprising:
an operation input part including a touch panel and a hardware key; and
a processor configured to:
transmit first screen information indicating a first screen including a touch panel area used for displaying a touch panel image representing said touch panel and a hardware key area used for displaying a hardware key image representing said hardware key and synthesizable area information indicating a synthesizable area not including said hardware key image to a remote operation apparatus remotely operating said image forming apparatus by using a remote operation screen;
wherein the synthesizable area is an area where an additional image managed by a managing information which associates said additional image with said first screen, said managing information being stored in the remote operation apparatus and used by the remote operation apparatus to retrieve said additional image, is synthesizable thereon so as to be positioned on the first screen without hiding the hardware key area.

6. A non-transitory computer-readable recording medium for recording therein a computer program to be executed by a computer incorporated in an image forming apparatus to cause said computer to perform the steps of:
a) generating first screen information indicating a first screen including a touch panel area used for displaying a touch panel image representing a touch panel and a hardware key area used for displaying a hardware key image representing a hardware key and synthesizable area information indicating a synthesizable area not including said hardware key image; and
b) transmitting said first screen information to a remote operation apparatus remotely operating said image forming apparatus by using a remote operation screen;
wherein the synthesizable area is an area where an additional image managed by a managing information which associates said additional image with said first screen, said managing information being stored in the remote operation apparatus and used by the remote operation apparatus to retrieve said additional image, is synthesizable thereon so as to be positioned on the first screen without hiding the hardware key area.

7. A remote operation apparatus for remotely operating an image forming apparatus by using a remote operation screen, comprising:
a display for displaying said remote operation screen;
a storage part for storing an information which associates an additional image with a first screen; and
a processor configured to:
receive first screen information indicating said first screen including a touch panel area used for displaying a touch panel image representing a touch panel and a hardware key area used for displaying a hardware key image representing a hardware key and synthesizable area information indicating a synthesizable area not including said hardware key image from said image forming apparatus;
generate a second screen by retrieving said additional image to be added to said first screen using said information stored in said storage part and synthesizing said additional image to be added to said first screen into said synthesizable area of said first screen so that said additional image is positioned on said first screen without hiding the hardware key area, on the basis of said synthesizable area information and said information stored in said storage part; and
display said second screen on said display part as said remote operation screen.

8. A non-transitory computer-readable recording medium for recording therein a computer program to be executed by a computer to cause said computer to perform the steps of:
a) receiving first screen information indicating a first screen including a touch panel area used for displaying a touch panel image representing a touch panel and a hardware key area used for displaying a hardware key image representing a hardware key and synthesizable area information indicating a synthesizable area not including said hardware key image from an image forming apparatus;
b) generating a second screen by retrieving said additional image to be added to said first screen using information which associates said additional image with said first screen and is stored in a storage part of a remote operation apparatus and synthesizing an additional image to be added to said first screen into said synthesizable area of said first screen so that said additional image is positioned on said first screen without hiding the hardware key area, on the basis of said synthesizable area information and said information; and
c) displaying said second screen as a remote operation screen.

9. The remote operation system according to claim 1, wherein said additional image is at least one of an image corresponding to an error notification and an image corresponding to internal memory of the remote operation apparatus.

10. The remote operation system according to claim 2, wherein said type of the additional image includes at least one of a type corresponding to an error notification and a type corresponding to an internal memory of the remote operation apparatus.

* * * * *